UNITED STATES PATENT OFFICE.

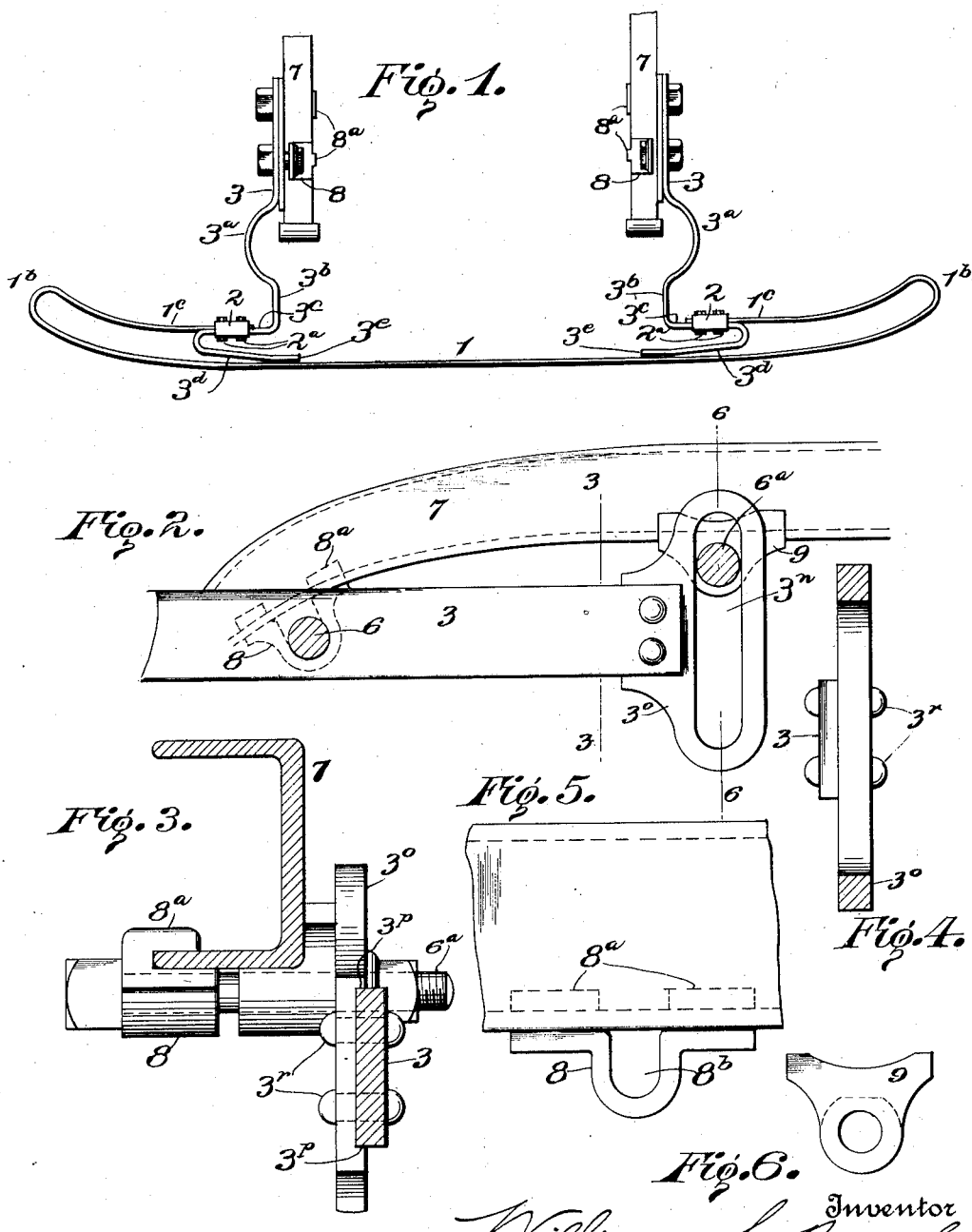

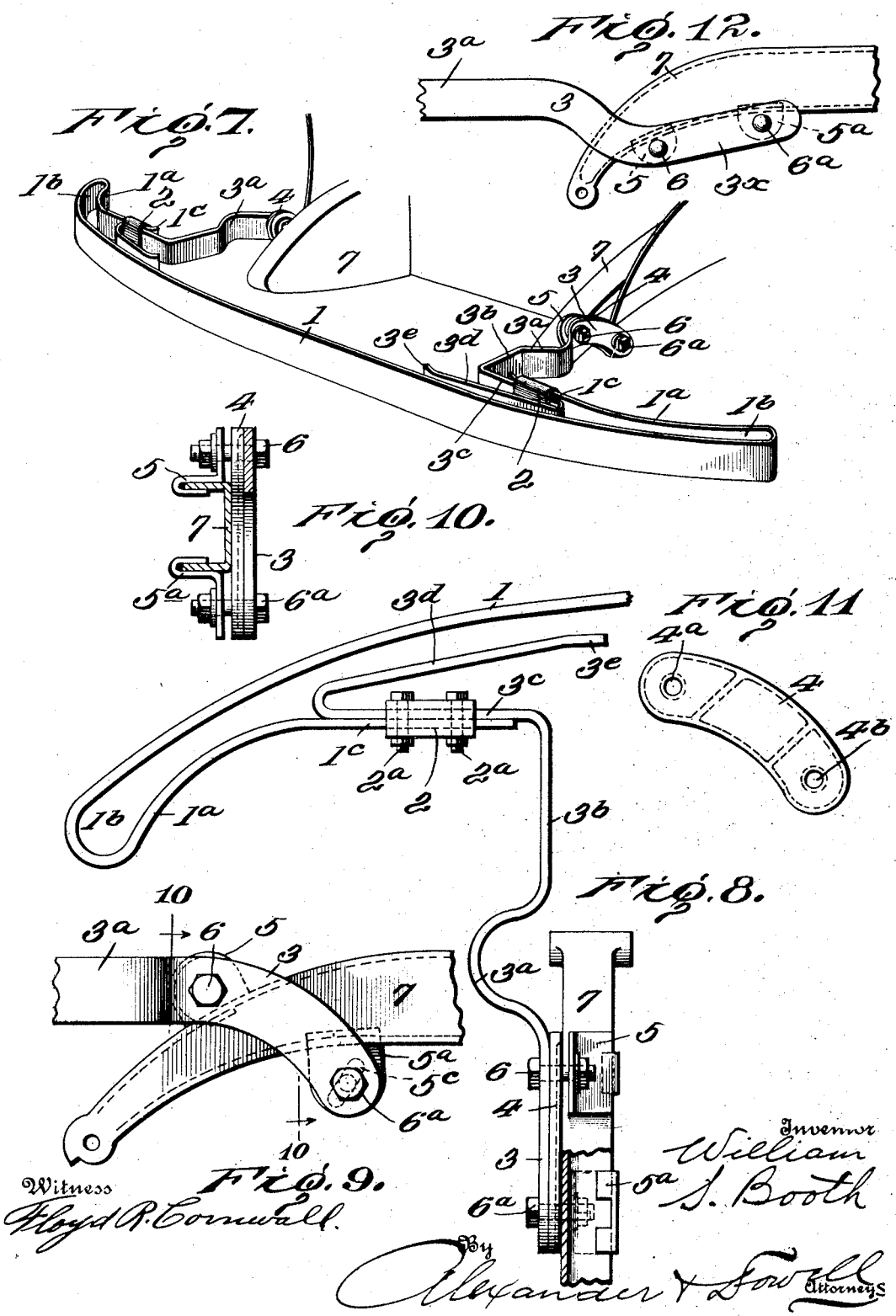

WILLIAM STEPHENSON BOOTH, OF OWOSSO, MICHIGAN.

AUTOMOBILE-BUMPER.

1,328,786. Specification of Letters Patent. Patented Jan. 20, 1920.

Application filed June 5, 1919. Serial No. 302,012.

*To all whom it may concern:*

Be it known that I, WILLIAM STEPHENSON BOOTH, a citizen of the United States, residing at Owosso, in the county of Shiawassee and State of Michigan, have invented certain new and useful Improvements in Automobile-Bumpers; and I hereby declare that the following is a full, clear, and exact description thereof, reference being had to the accompanying drawings, which form part of this specification.

This invention is an improvement in bumpers for automobiles; and its objects are, (1) to provide a spring bumper so curved as to give a glancing blow; and readily attachable to chassis of different widths without changing the length of the front bumper bar; (2) to avoid the use of clamps on the front bumper bar, which impair its symmetrical appearance and are apt to mar objects that might contact therewith; (3) to provide a bumper having three successively acting provisions for shock absorption; (4) to provide bumper attaching means which will clear the splash pan on the car; (5) to provide thin hook brackets which will slip under or by the splash pan; and (6) to enable the front bumper bar to be adjusted to different heights on the chassis.

I will explain the invention with reference to the accompanying drawings which illustrate practical embodiments thereof and will enable others to readily adapt and use the same; and refer to the appended claims for summaries of the essentials of the invention, and novel features of construction and novel combinations of parts, for all of which protection is desired.

In said drawings:

Figure 1 is a top plan view of my novel bumper applied to the front of the chassis of an automobile.

Fig. 2 is an enlarged side view thereof showing the means for connecting the bumper to the chassis.

Fig. 3 is a vertical transverse section on the line 3—3, Fig. 2.

Fig. 4 is a detail section on the line 6—6.

Figs. 5 and 6 are details.

Fig. 7 is a perspective view of the bumper as applied to the front of an automobile.

Fig. 8 is an enlarged view of part of the bumper and its mountings.

Fig. 9 is a detail side view of Fig. 10.

Fig. 10 is a transverse section on line 10—10, Fig. 9.

Fig. 11 is a detail view of the plate 4.

Fig. 12 illustrates a view of a slight modification.

The bumper as shown comprises a main bar which has a front portion 1 that extends continuously across the front of the vehicle and is preferably of a length equal to or greater than the width of the wheel base. The front part 1 of the main bar is bent on a practically continuous arc, but curves rearwardly at its ends more than at the central portion thereof. The ends of this main bar are bent inwardly relatively to the ends of the front portion 1 forming return bends or loops $1^b$ at each end of the bumper; and the extremities $1^c$ of the main bar extend practically directly toward each other and to points in front of the wheels of the vehicle.

The parts $1^c$ are arranged in the same plane, and the extremities of these parts $1^c$ are secured by clips 2 to supporting members by which the front bar is supported on and attached to the chassis. The clips 2 may be U-shaped clips secured by bolts $2^a$ as indicated in the drawings.

The main bar and the supporting members are preferably formed out of flat bar metal, arranged vertically edgewise.

Each supporting member is bent in a peculiar form, and has a rear end portion 3 which is adapted to be secured to the adjacent member of the chassis. Each member also has a bent portion $3^a$ connecting the front end of part 3 with the rear end of a straight portion $3^b$ in line with part 3, and part $3^b$ is connected at its front end with a part $3^c$ which is bent at substantially right angles to the part $3^b$ and is adjustably secured to the adjacent end $1^c$ of the main bumper bar, preferably by a clip 2 as shown. Each supporting member also has extending from the outer end of the part $3^c$ an inwardly bent portion $3^d$ which projects slightly forward toward, but does not normally contact with, the front portion of bar 1, the extremity $3^e$ of the supporting member being slightly spaced from and parallel with the inner face of the front portion 1 of the bumper bar as shown.

The parts $3^c$ and $3^d$ practically form a return bend loop; and part $3^d$ forms an important function as an auxiliary shock absorbing and cushioning means which will come into play if the front portion 1 of the main bar should be forced back until the extremities $3^e$ of the supporting members would be contacted by the part 1, under forced distortion of the latter, and thereupon would reinforce the bumper bar at two points between the ends of bends 1ᵇ thereof. In applying the bumper to a chassis the clips 2 may be loosened so that the members 3 can be adjusted to or from each other to suit the width of the chassis, and after the supporting members are properly secured to the chassis the bolts 2ᵃ can be tightened to firmly secure the main bumper bar 1 to the supporting members.

The part 3 of each supporting member is preferably adjustably secured to the front end of the adjacent side member 7 of the chassis of an automobile, which may be of the usual construction, by any suitable means. In the construction shown in Figs. 1 to 6 the portion 3 of each supporting member is provided at its extremity with a slot 3ⁿ for engagement of a retaining bolt 6ᵃ, and in advance of the slot with a perforation for the passage of a retaining and supporting bolt 6. The bolt 6 is detachably attached to the member 7 of the chassis by means of a clip 8 which is provided with lips 8ᵃ, engaging the flange of the chassis member 7, and with an eye 8ᵇ for the passage of the bolt 6.

A spacer 9 is preferably strung on the bolt and interposed between the outer side of the member 7, and the part 3 of the supporting member. The bolt 6ᵃ may be similarly attached to the chassis by a bracket 8 such as above described and if desired may be similarly spaced from the chassis by a flanged washer 9. The bolts are secured by suitable nuts and washers as shown thus clamping the part 3 securely to the chassis and suspending it thereon.

The slot 3ⁿ is preferably formed in a malleable casting or stamping 3° securely fastened to the end of the member 3 as shown. This casting may be recessed as at 3ᵖ and the end of member 3 fitted into this recess and secured thereto by rivets 3ʳ thus making a firm connection.

This construction enables the bumper to be readily attached to chassis of different widths, and to be adjusted to different heights; as by loosening the nuts on the bolts 6ᵃ the bumper can be tilted on bolts 6, as a fulcrum, and when positioned to the desired height the nuts on bolts 6ᵃ are tightened, locking the bumper in the desired position.

The spacers 9 permit the supporting member 3 to clear any rivet heads that may be on or connected with the chassis member 3; therefore I preferably use the spacer washers on the bolts, but they are not essential and can be dispensed with.

As shown in Figs. 7 to 11 the rear portion of each supporting member 3 is curved downwardly and has perforations for the passage of the bolts 6, 6ᵃ, and a cast or forged plate 4 (see Fig. 11) is interposed between the part 3 of the supporting member and the chassis member 7, and is provided with openings for the passage of the bolts 6, 6ᵃ which pass through the corresponding perforations in part 3 and through corresponding openings in the plate 4, and through openings in flanged clips 5, 5ᵃ which are preferably drop forged out of sheet metal and are adapted to engage the flanges of the chassis member 7 (see Figs. 8 and 10) and are secured by the bolts 6, 6ᵃ thus securely fastening the clips and supporting members to the chassis.

The plates 4 are employed to cover any bolt or rivet heads on the chassis and to provide an enlarged flat contact surface against which parts 3 of the supporting members may be clamped as shown. In some cases the plates 4 might be omitted. The particular means of fastening the supporting members to the chassis may be varied in accordance with the chassis of the particular make of automobile or vehicle to which the bumper is to be attached.

The clip 5ᵃ may be provided with a curved slot 5ᶜ (indicated in dotted lines in Fig. 10), to permit the supporting members to be tilted slightly on the bolts 6, as fulcrums, and thus slightly elevate or lower the front bar 1, relative to the chassis.

As indicated in Fig. 12 the supporting members are formed with a reverse curve and an extension 3ˣ, and the perforations for the bolts 6 and 6ᵃ are formed in this extension 3ˣ. Of course the invention is not restricted to the specific shape of the supporting members 3, nor to any particular specific means of attaching the supporting members to the chassis, as it is necessary to change the attachment of the supporting member to suit the chassis of different makes of automobiles.

It will be seen that there are no joints or clips on the front bumper bar 1; that said bar extends entirely across the width of the wheel base of the vehicle; that the bumper bar is curved so that wherever struck it would tend to give a glancing blow thus lessening shock or impact; and that this novel bumper can be readily applied to chassis of different widths.

The resiliency of the main bar 1 affords the primary cushioning means in event of shock; and this cushioning effect is enhanced by the loops 1ᵇ. If the pressure against the bar 1 is so great as to cause said bar 1 to contact with the parts 3ᵉ of the supporting members the auxiliary spring parts 3ᵈ of the said members come into play and afford a second cushioning and shock resisting means. Transmission of shocks from the main bar 1 through loops 1ᵇ and supporting members 3 to the chassis would be further cushioned between the bar 1 and the chassis by the bends 3ª in the supporting members; such bends providing a third cushioning means.

What I claim is:

1. A bumper for automobiles and the like; comprising a main bar having a front portion extending across the wheel base and return bends at the ends of such front portion; and supporting members attached to the chassis of the vehicle; the front portions of the supporting members forming secondary shock absorbing means lying in rear of the front portion of the main bar and in advance of the return bend portions thereof and adapted to come into action when said front portion is unduly compressed or distorted.

2. A bumper for automobiles and the like; comprising a main bar having a front portion extending across the wheel base and return bends at the ends of such front portion; supporting members attached to the chassis of the vehicle; and secondary shock absorbing means on the front ends of said supporting members and lying between the front portion of the main bar and the return bends thereof and adapted to come into action when said front portion is unduly compressed or distorted; said supporting members also having bends intermediate the loops and the chassis, forming auxiliary shock absorbing means, substantially as described.

3. A bumper for automobiles and the like; comprising a main front bar having a front portion extending across the wheel base and return bends at the ends of the front portion; and supporting members attached to the chassis of the vehicle and provided with return bends on their front ends forming secondary shock absorbing means lying in rear of the front portion of the main bar and in front of the return bends thereof and adapted to come into action when said portion is unduly compressed or distorted; said cushioning supporting members also having bends intermediate the loops and the chassis, forming third auxiliary shock absorbing means, substantially as described.

4. A bumper for automobiles and the like; comprising a main bar having a front portion extending across the wheel base and return bends at the ends of such front portion; and supporting members attached to the chassis of the vehicle; the front portions of the supporting members forming secondary shock absorbing means lying in rear of the front portion of the main bar and adapted to come into action when said portion is unduly compressed or distorted; with means for adjustably attaching the front bar to the forward supporting members; and means for adjustably connecting the supporting members to the chassis.

5. A bumper for automobiles and the like; comprising a main front bar having a front portion extending across the wheel base and return bends at the ends of the front portion; and supporting members attached to the chassis of the vehicle and provided with return bends on their front ends forming secondary shock absorbing means lying in rear of the front portion of the main bar and adapted to come into action when said portion is unduly compressed or distorted; said cushioning supporting members also having bends intermediate the loops and the chassis, forming third auxiliary shock absorbing means; with means for adjustably attaching the front bar to the forward supporting members; and means for adjustably connecting the supporting members to the chassis.

6. A bumper for automobiles and the like; comprising a main bar having a front portion extending across the wheel base and return bends at the ends of such front portion; supporting members attached to the chassis of the vehicle, the front portions of the supporting members forming secondary shock absorbing means lying in rear of the front portion of the main bar and in front of the return bends thereof; said supporting members having their rear ends perforated for the passage of retaining bolts; adjustable clips engaged with the chassis; and bolts transfixing the ends of the supporting members and the clips, whereby the supporting members are attached to the chassis.

7. A bumper for automobiles and the like; comprising a bar having a front portion extending across the wheel base; supporting members attached to the chassis of the vehicle having their rear portions provided with vertically disposed elongated slots and with perforations in front of the slots; clips detachably engaged with the chassis; spaces interposed between the ends of the supporting members and the chassis, and bolts engaging the slots and perforations in the supporting members, the spacers and the clips, whereby the supporting members are attached to the chassis.

8. A bumper for automobiles and the like; comprising a main bar having a front portion extending across the wheel base and return bends at the ends of such front portion; supporting members attached to the chassis of the vehicle, the front portions of the supporting members forming secondary shock absorbing means lying in rear of the front portion of the main bar and in front of the return bends thereof; said supporting members having their rear portions slotted and perforated for the passage of retaining bolts; clips engaged with the chassis; and bolts transfixing the ends of the supporting members and the clips, whereby the supporting members are attached to the chassis.

9. A bumper for automobiles and the like; comprising a main bar having a portion extending across the wheel base and return bends at the ends of the front portion; supporting members attached to the chassis of the vehicle and provided with return bends on their front ends forming secondary shock absorbing means lying in rear of the front portion of the main bar; said supporting members having their rear parts slotted and perforated for the passage of retaining bolts; clips engaged with the chassis; spacer washers interposed between the supporting members and the chassis; and bolts transfixing the ends of the supporting members the clips and spacers to attach the supporting members to the chassis.

10. A bumper for automobiles and the like; comprising a main bar having a portion extending across the wheel base and return bends at the ends of the front portion; supporting members attached to the chassis of the vehicle and provided with return bends on their front ends forming secondary shock absorbing means lying in rear of the front portion of the main bar; said supporting members also having bends intermediate the loops and the chassis, forming auxiliary shock absorbing means; slotted plates attached to the rear ends of the supporting members; clips engaged with the chassis; spacers interposed between the supporting members and the chassis; and bolts transfixing the ends of the supporting members and the slotted plates the clips and spacers, substantially as described.

In testimony that I claim the foregoing as my own, I affix my signature.

WILLIAM STEPHENSON BOOTH.